United States Patent

[11] 3,607,434

| [72] | Inventors | Brian Robert Allen<br>Bournville;<br>Kenneth George Blandford, Solihull, both of England |
|---|---|---|
| [21] | Appl. No. | 859,742 |
| [22] | Filed | Sept. 22, 1969 |
| [45] | Patented | Sept. 21, 1971 |
| [73] | Assignee | Joseph Lucas (Industries) Limited<br>Birmingham, England |
| [32] | Priority | Sept. 30, 1968 |
| [33] | | Great Britain |
| [31] | | 46263/68 |

[54] ELECTRIC STORAGE BATTERY INTERCELL CONNECTORS
2 Claims, 5 Drawing Figs.

[52] U.S. Cl. ..................................................... 136/134 R,
136/176
[51] Int. Cl. ........................................................ H01m 13/10
[50] Field of Search ........................................... 136/134,
176, 175, 170, 166

[56] References Cited
UNITED STATES PATENTS

| 2,057,729 | 10/1936 | Mayer .......................... | 136/134 |
| 2,692,906 | 10/1954 | Morgan ....................... | 136/166 |
| 3,303,056 | 2/1967 | Sabatino et al. .............. | 136/135 |
| 3,441,448 | 4/1969 | Hyward et al. ................ | 136/176 |
| 3,515,597 | 6/1970 | Barnes et al. ................. | 136/134 |

*Primary Examiner*—Winston A. Douglas
*Assistant Examiner*—A. Skapars
*Attorney*—Holman, Glascock, Downing & Seebold

ABSTRACT: An electric storage battery of the type in which adjacent cells are connected through intercell connectors extending through the cell wall having an additional connector integral with or secured to one of the intercell connectors by resistance welding, the additional connector having a portion extending along one of the sidewalls of the battery box and connected through that sidewall with an external terminal to provide an additional voltage tapping from the battery.

ELECTRIC STORAGE BATTERY INTERCELL CONNECTORS

This invention relates to electric storage batteries, particularly lead-acid batteries.

A battery according to the invention includes a box having sidewalls, end walls and a plurality of partition walls parallel with the end walls and dividing the battery box into compartments, an assembly of battery plates and separators within each compartment, a plurality of intercell connectors extending through the partition walls and forming interconnections between plates in adjacent compartment, the holes in the partition walls through which the intercell connectors extend being sealed, a lid closing the box, a pair of external terminals connected to plates in the end compartments respectively, and a connector extending through one of the sidewalls of the box in sealing relationship therewith, the connector extending from to one of the intercell connectors and providing a third terminal on the exterior of the box.

Figure 1:
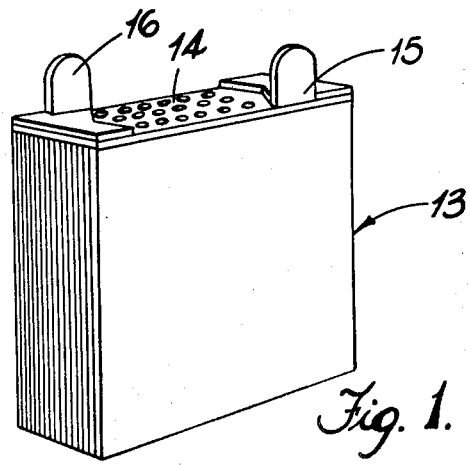
Figure 2:
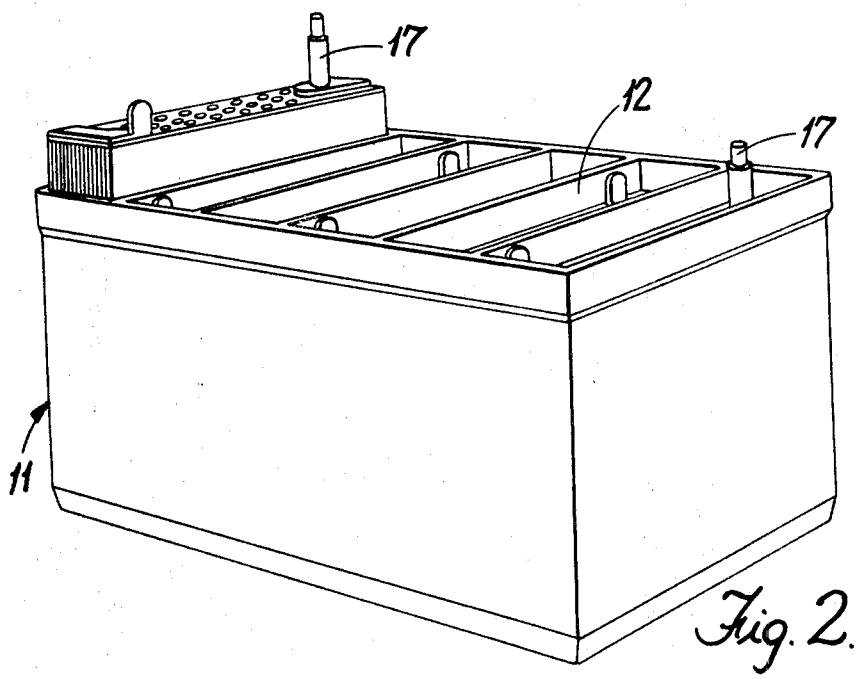
Figure 3:
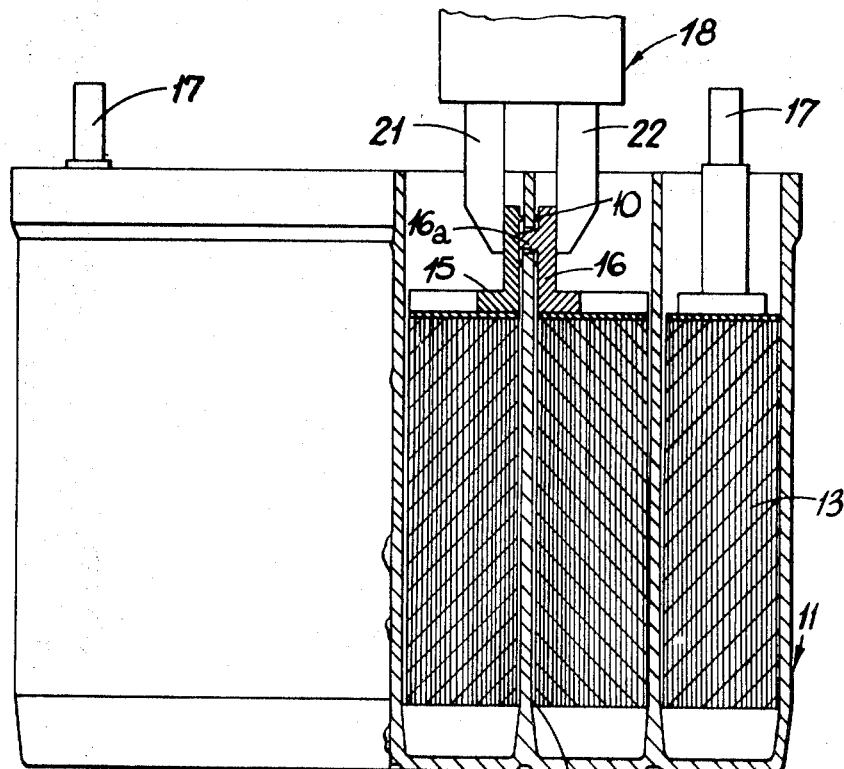
Figure 4:
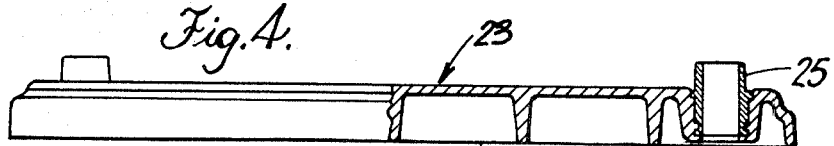
Figure 5:
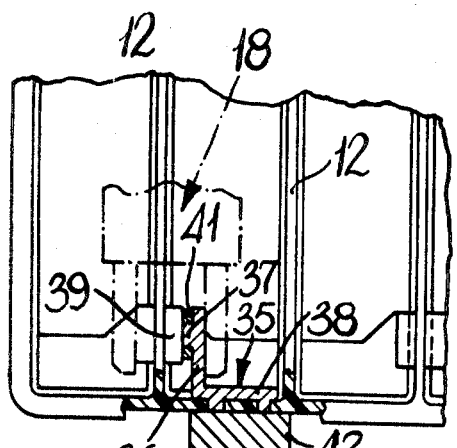

In the accompanying drawings, which illustrate the manufacture of a battery in accordance with one example of the invention, FIG. 1 illustrates a pack of battery plates and separators, FIG. 2 shows a battery box with all but one of the packs in position, FIG. 3 is a part-sectional view of the battery box illustrating the completion of the intercells connections, FIG. 4 is a part-sectional view of the battery lid, and FIG. 5 is a part-sectional plan view of part of the battery illustrating the connection of the third exterior terminal on the battery.

Referring first to FIGS. 1 to 3, a battery box 11 is moulded from polypropylene or other suitable thermoplastic, the box including partition walls 12 dividing the box into six compartments. Each compartment receives a preformed pack 13 of battery plates and separators, the tops of the plates and separators being protected by a perforated splash guard 14. The plates in the individual packs are interconnected in parallel, and the two sets of plates in each of the four packs which are to be mounted in the central compartments of the box 11 are connected respectively to conductive connecting lugs 15, 16 formed with extensions which in use extend substantially parallel to the partition walls 12, the extensions on the lugs 16 being formed with outwardly extending spigots 16a (FIG 3). The packs which are to be placed in the end compartments each have one set of plates connected to a lug 15 or 16, and their other sets of plates connected respectively to the terminal posts 17 of the battery.

The partition walls 12 have holes stamped therein, and the arrangement is such that when the packs are positioned in the box 11, and each spigot 16a passes through a hole and engages a lug 15 on a pack in the adjacent cell. The walls 12 are sufficiently flexible to permit introduction of the packs into the compartments before the spigots 16a enter their respective holes. It will be noted that the lugs 15, 16 are formed with integral ring-shaped upstanding portions 10 which surround the hole in the wall 12. When all the packs are in position, the required intercell connections are completed by resistance welding apparatus 18 shown in FIG. 3. This apparatus includes a pair of electrodes 21, 22 which engage corresponding lugs 15, 16 respectively, and between which pressure can be applied to complete the required connection and at the same time seal the holes in the walls 12.

The lid 23, shown in FIG. 4, is also moulded from polypropylene or other suitable thermoplastic and has a peripheral edge adapted to engage the top of the box together with ribs 24 adapted to engage the tops of the walls 12. The lid is formed with a pair of integral upstanding hollow spigots 25 which receive the terminal posts 17 respectively. The lid is secured to the box 11 by welding.

Within one of the compartments and positioned above the battery plates and separators is an L-shaped connector 35 one limb 36 of which is provided with a projection 37. After the intercell connections have been formed, the connector 35 is placed within the compartment with the projection 37 engaging one of the intercell connectors 39, the projection 37 being surrounded by a nonconductive annular resilient washer 41. The connector 35 is then secured to the connector 39 by resistance welding as in the apparatus 18, the purpose of the projection 37 being to ensure that the flow of current is confined to a small part of the connector 39 so that a connection is made without disturbing the seal in the wall 12. The washer 41 ensures that the molten metal is confined to the area where the joint is required. After the connector 35 has been secured to the connector 39, a further connection is made through the sidewall 34 between the limb 38 of the L-shaped connector 35 and an external connector 42, the limb 38 having a pair of projections which extend into holes in the sidewall 34 of the battery box and engage the connector 42. This connection is also made by resistance welding, and where necessary the parts extending through the holes in the wall 34 are surrounded by upstanding ribs which bite into the wall to effect the required seal. The welding operations are of course all carried out prior to the welding of the lid to the box.

Although in the example described the limb 38 has a pair of projections, the projections could be formed integrally with the connector 42, or projections may be provided on both components 42 and 38 such that the joint occurred within the holes, or combinations of the above could be used.

Where a third terminal is provided on an electric storage battery, the battery can be used to operate devices requiring lower voltages than the voltage normally supplied between the two end terminals.

In a modification the limb 38 is formed integrally with the appropriate conductive lug 15, 16 so that the first resistance welding operation described above is unnecessary.

Having thus described our invention what we claim as new and desire to secure by Letters Patent is:

1. An electric storage battery including a box having sidewalls, end walls and a plurality of partition walls parallel with the end walls and dividing the battery box into compartments, an assembly of battery plates and separators within each compartment, a plurality of intercell connectors extending through the partition walls and forming interconnections between plates in adjacent compartments, the holes in the partition walls through which the intercell connectors extend being sealed, a lid closing the box, a pair of external terminals connected to plates in the end compartments respectively, and extending through the lid and a connector extending through one of the sidewalls of the box in sealing relationship therewith, and providing a third terminal on the exterior of the box, said connector being L-shaped with one limb extending along the sidewall of the box and the other limb extending parallel to the partition walls, said other limb having a projection engaging said intercell connector and through which the connector is resistance welded to the intercell connector, the projection being surrounded by an annular nonconductive washer which prevents flow of molten metal pass the washer during the resistance welding.

2. A battery as claimed in claim 1 in which the connector is integral with one of the intercell connectors.